3,779,974
SULFONATED BUTYL RUBBER LATICES

Addison W. Hubbard, Scotch Plains, and Kenneth W. Powers, Berkeley Heights, N.J., assignors to Esso Research and Engineering Company
No Drawing. Filed Sept. 26, 1972, Ser. No. 292,415
Int. Cl. C08d 5/00
U.S. Cl. 260—29.7 B    10 Claims

ABSTRACT OF THE DISCLOSURE

A rubber latex of sulfonated butyl rubber containing >0.5 mole percent $SO_3H$ is prepared by forming an emulsion of a solution of sulfonated butyl rubber in a suitable solvent using non-ionic emulsifiers and thereafter stripping off the solvent to leave a latex of sulfonated butyl rubber dispersed in water. Prior to stripping the solvent, the emulsifiers are removed from the system by centrifugation, the sulfonated butyl rubber being self-emulsifiable, once it has been dispersed. Plasticizers are added to the latex to prevent cracking of films prepared therefrom.

BACKGROUND OF THE INVENTION

This invention relates to the production of aqueous latices from solvent dispersions of butyl rubber compositions. In particular, the invention relates to production of latices of sulfonated butyl rubber.

Generally, the synthetic latices of high polymers have been prepared by emulsion polymerization. For example, acrylic resins and polystyrene latices are prepared by the direct emulsion polymerization of the monomers in a water suspension. Such methods are not applicable to high polymers which must be made by essentially an anhydrous catalysis polymerization.

Methods of preparing aqueous latices of these polymers have been developed which comprise the general steps of (1) providing a dispersion of cement in a volatile organic solvent for the polymer, (2) adding to such dispersion water and an aqueous emulsifier and emulsifying the same to produce an emulsion, (3) stripping the volatile organic solvent from the emulsion and (4) recovering resultant latex product; see, for example, U.S. Pat. 3,503,917 incorporated herein by reference.

Elastomer latices have been prepared from various polymers such as butyl rubber, ethylene propylene terpolymers (EPDM), natural rubber, SBR, etc. Sulfonated derivatives of these polymers may be prepared by methods kown in the art. It is not possible to prepare emulsions of the highly sulfonated polymers in the same manner as the methods used for the preparation of emulsions and latices of the unsulfonated materials. Methods for emulsifying highly sulfonated butyl rubber are taught in application of Hubbard et al. filed about Jan. 20, 1972, now U.S. Pat. application No. 219,496 incorporated herein by reference. These methods include dissolving the polymer in a suitable solvent including a polar organic solvent, emulsifying the solution using nonionic emulsifiers and thereafter stripping off the solvents and some water.

It is known in the art to concentrate latices by centrifuging to remove excess water.

SUMMARY OF THE INVENTION

It has surprisingly been found that latices of sulfonated butyl rubber may be greatly improved by centrifuging the emulsion from which they are formed prior to stripping off solvents. The emulsion separates into a concentrated dispersion of polymer solution in water and a serum phase comprising emulsifier and polar solvent. Hence, the final latex is substantially free of emulsifier which otherwise acts as impurities in films cast therefrom. The serum phase containing the emulsifiers and polar cosolvent can be recycled and reused in emulsifying a new batch of cement to substantially reduce emulsifier costs.

An improved method of forming the latices of sulfonated polymers comprises using as the solvent for the polymer a water miscible solvent, e.g., tetrahydrofuran.

The sulfonated butyl rubber latices are plasticized by the addition of plasticizer, e.g., emulsified rubber process oils to the latex, thereby avoiding cracking of films cast therefrom.

Ordinarily, in the preparation of latices of polymers from emulsions, the emulsifiers used are ionic emulsifiers which are stable at stripping conditions but if nonionics are employed the stripping conditions are chosen so that the emulsifiers will be stable. These emulsifiers are an essential part of the latex which would otherwise coagulate if the emulsifiers were removed. Sulfonated butyl rubber latices are preferably prepared using nonionic emulsifiers which breakdown at stripping conditions particularly when the acid form of the polymer is stripped. Fortunately, where emulsions are formed using the polar cosolvent the latices are stable even though the emulsifiers are destroyed. The emulsifiers and their decomposition products are undesirable impurities in products formed from the latices.

DETAILED DESCRIPTION OF THE INVENTION

This invention relates to an improved method of preparing sulfonated butyl rubber latices. In particular, the invention relates to a method for preparing the aforesaid latices from emulsions of sulfonated butyl rubber in water.

In the preparation of such latices, it is necessary to disperse a solution of the rubber in organic solvent into a water phase. The dispersion is accomplished by the use of emulsifying agents.

The term "butyl rubber" as used in the specification and claims means copolymers of isoolefins and conjugated dienes which comprise about 0.5 to about 15 mole percent conjugated diene and about 85 to 99.5 mole percent isoolefin. Illustrative examples of the isoolefins which may be used in the preparation of butyl rubber are isobutylene, 2-methyl-1-butene, 3-methyl-1-butene, 4-methyl-1-pentene and β-pinene. Illustrative examples of conjugated dienes which may be used in the preparation of butyl rubber are isoprene, butadiene, 2,3-dimethyl butadiene, chloroprene, piperylene, 2,5-dimethyl-hexa-2,4-diene, cyclopentadiene, cyclohexadiene and methyl-cyclopentadiene. The preparation of butyl rubber is described in U.S. Pat. 2,356,128 and is further described in an article by R. M. Thomas et al. in Industrial and Engineering Chemistry, Vol. 32, pp. 1283 et seq., October 1940.

The preparation of sulfonated butyl rubber is well known in the art. Butyl rubber may be sulfonated by reacting a solution of butyl rubber in a suitable solvent for the butyl rubber with a sulfonating agent. The sulfonating agent may be an acyl sulfate or a complex of a Lewis base and a sulfur trioxide donor. Illustrative examples of Lewis bases which may be used are trialkyl phosphates, dioxanes, trialkyl amines, etc. A detailed description of the manner of preparing sulfonated butyl rubber may be found in U.S. Pat. 3,642,728, and U.S. application Ser. No. 123,908 incorporated herein by reference. This invention is in no way intended to be limited by the method of producing the sulfonated butyl rubber.

Although the methods for preparing sulfonated butyl rubber invariably include the step of neutralizing the sulfonic acid, it is essential in the preparation of the emulsions that the acid form rather than the neutralized form be used. The neutralized form of the rubber has substantially improved physical properties including tensile strength. The acid form having reactive hydrogens will react with many surfaces to provide adhesion and may be involved in other chemical reactions. The latices formed from the acid form of the polymer may be neutralized to take advantage of the advantageous properties of the ionomers formed by sulfonating and neutralizing the sulfonated butyl rubber. The emulsifiers which may be used in the practice of this invention are preferably nonionic emulsifiers. The anionic or cationic emulsifiers are less suitable for the emulsificaton of the sulfonated butyl rubber.

Generally, in the preparation of the sulfonated polymer the butyl rubber is sulfonated in solution. The sulfonated polymer in its acid form is then neutralized and precipitated to recover the ionomeric composition which has improved physical properties. It has not been possible to emulsify the neutralized polymer salts. Not wishing to be bound by theory, it is thought that the difficulty encountered is a result of the ionic bonding which gives the ionomer its unique properties. The inventors have found, however, that the acid form may be emulsified provided that a cosolvent is incorporated into the solution of sulfonated butyl rubber and organic solvent.

Generally any organic solvent which is a solvent for butyl rubber is suitable as the solvent for the sulfonated polymer provided it is used with a suitable cosolvent. Illustrative examples of such solvents are hexane, heptane, octane, benzene, toluene, xylene, etc. Preferably the organic solvent is a $C_6$–$C_{10}$ hydrocarbon solvent. More preferably, it is a $C_6$ to $C_8$ hydrocarbon solvent, e.g., hexane. Halogenated solvents such as carbon tetrachloride, methylene chloride, perchloroethylene, etc., are also suitable.

The cosolvents suitable for use in the practice of this invention must be an organic solvent which is at least partly soluble both in water and in the organic solvent which is the solvent for the polymer. Suitable cosolvents include esters, alcohols, ketones, ethers, etc. Illustrative examples of such cosolvents are $C_2$–$C_8$ alcohols, ethyl acetate, amyl acetate, tetrahydrofuran, dimethyl ether, dimethyl sulfoxides, dioxanes, dimethyl formamide, etc.

The nonionic emulsifiers suitable for use in the practice of this invention include ethoxylated alkyl phenols, propoxylated alkyl phenols, ethoxylated or propoxylated alcohols and ethoxylated polypropylene oxides. The preferred ethoxylated alkyl phenols are $C_8$–$C_{12}$ alkyl phenols. The ethoxylated polypropylene oxide is a block copolymer. The polypropylene oxide comprises the central block of an ETO-PPO-ETO block copolymer. At least one of the nonionic emulsifiers must be an ethoxylated or propoxylated alkyl phenol.

Illustrative examples of the emulsifiers which may be used in the practice of this invention are Neutronyx 622, an ethoxylated octyl phenol comprising 4 moles of ethylene oxide (EtO), Neutronyx 675, an ethoxylated octyl phenol comprising 30 moles of EtO; Igepal CO–530, an ethoxylated nonyl phenol comprising 6 moles of EtO; Triton X–100, an ethoxylated octyl phenol comprising about 9.5 moles of EtO; Tergitol NP–14, an ethoxylated nonyl phenol comprising 4 moles of EtO; Emulphogene BC–720, an ethoxylated tridecyl alcohol comprising 15 moles of EtO; Emulphogene BC–940, an ethoxylated tridecyl alcohol comprising 30 moles of EtO; Siponic Y–500, an ethoxylated oleyl alcohol comprising 17 moles of EtO.

Another class of emulsifiers suitable for use in the practice of this invention are Puronics emulsifiers. These have the general structure EtO-PPO-EtO. The polypropylene oxide unit (PPO) has a molecular weight of about 1750. Each of the EtO groups are of approximately equal molecular weight. Pluronics L61 is comprised of 15 mole percent EtO, Pluronics L64 is comprised of 45 mole percent EtO and Pluronics F68 comprises about 85 mole percent EtO.

In order to form stable emulsions, it is necessary that at least one of the emulsifiers be either water soluble or water dispersible. The other emulsifiers should be soluble in the solvent for the polymer. About 5 to about 15 weight percent emulsifier based on the weight of sulfonated rubber is required to effectively emulsify the rubber solvent system. More preferably about 8 to 12 weight percent, e.g., 10 weight percent emulsifier is used. Table I lists illustrative examples of pairs of emulsifier systems and the weight ratio of emulsifiers which are suitable for use in the practice of this invention. The HLB of the emulsifier system appears in the right hand column.

TABLE I

| | | Weight ratio | HLB |
|---|---|---|---|
| 1 | Neutronyx 675 | 2 | |
| | Igepal CO–630 | 1 | 16 |
| 2 | Neutronyx 675 | 2.0 | |
| | Triton X–100 | 1.0 | 16.7 |
| 3 | Neutronyx 675 | 2.0 | |
| | Tergitol | 1.0 | 15.3 |
| 4 | Neutronyx 675 | 0.75 | |
| | Pluronic F–68 | 0.75 | |
| | Igepal CO–530 | 1.50 | 14.7 |
| 5 | Neutronyx 675 | 1.0 | |
| | Emulphogene BC–720 | 1.0 | 16 |
| 6 | Emulphogene BC–840 | 1.0 | |
| | Pluronics F–68/L–61, 85/15 blend | 1.0 | |
| | Igepal CO–530 | 1.0 | 14.7 |
| 7 | Emulphogene BC–840 | 0.75 | |
| | Pluronic F–68 | 0.75 | |
| | Igepal CO–530 | 1.50 | 14.5 |
| 8 | Pluronic F–68 | 1.0 | |
| | Siponic Y–500 | 1.0 | 15.5 |
| 9 | Neutronyx 675 | 5.0 | |
| | Igepal CO–530 | 1.0 | 17.0 |

In the preparation of the emulsion, a solution of sulfonated butyl rubber cement is prepared comprising about 5 to about 15 weight percent rubber. The balance of the cement comprises organic solvent and polar organic cosolvent. For the purposes of simplicity, the cement including cosolvent is hereinafter referred to as the "oil phase."

In preparing the emulsion of polymer in water, the solvent dispersible or solvent soluble emulsifier is dispersed in the oil phase. The water dispersible or water soluble emulsifier is preferably dispersed in the water phase. The water is then added to the oil phase with agitation until inversion occurs. This crude emulsion is then further agitated in the dispersing or colloidal mill to reduce the particle size. This emulsion is then heated with steam to strip off solvent and any remaining cosolvent to leave a stable material. The resulting latex generally includes the emulsifier used. A detailed description of methods in preparing sulfonated butyl rubber latices is described in U.S. patent application No. 219,496, filed in the name of Hubbard, Powers and O'Farrell. The inventions disclosed herein are in no way intended to be limited by the emulsifier system used to emulsify the sulfonated butyl rubber.

While the procedures described in U.S. Application No. 219,496 can be applied to produce sulfobutyl latexes, the process is not economical in view of emulsifier costs. The high emulsifier concentrations required result in very high emulsifier costs and contribute greatly to the cost of the final latex. Furthermore, the nonionic emulsifiers used are unstable and cleave under the acidic conditions which prevail during stripping of acid-form sulfobutyl latex. The cleavage products (steam) distill off with the water and coat the stripping apparatus and condensers with a waxy deposit which fouls them. Frequent shutdowns for a costly cleaning operation are required. The high emulsifier content and cleavage products left in the stripped latex cause quality problems in the latex (i.e., water sensitivity of films, loss of strength, adhesion problems, etc.) so that a post-stripping redilution and centrifugation is required to remove these water solubles and improve latex quality. This step is also costly and wastes all of the cleaved emulsifiers as well as creating a disposal problem for the useless serum phase recovered. It is the object of this invention to circumvent all these problems of the earlier process by employing raw (unstripped) latex centrifugation.

Ordinarily in the preparation of latices of polymers, emulsifiers which are stable at stripping conditions are employed. These emulsifiers are an essential part of the latex which would otherwise coagulate if the emulsifiers were removed. The particle size and stability of these latices are functions of the emulsifier system and concentration and the emulsifiers are an essential part of the latex at all stages of manufacture and use. The emulsifiers are costly and it has long been recognized that emulsifiers have adverse effects in dried films deposited from latex such as increasing rewettability or water absorption of the films; decreasing physical strength properties; interfering with adhesion to fillers, fibers, substrates, etc.; however, the emulsifiers are the essential "sine qua non" and their presence must be tolerated. Nevertheless, in order to minimize cost and their adverse side effects, every effort is made to minimize emulsifier concentration. And since the amount of emulsifier required to produce a latex of the desired particle size is often larger than that required during storage or use of latex, it is well known to reduce emulsifier concentration in the finished latex by dilution followed by "creaming" or centrifugation. However, at all times, sufficient emulsifiers must be retained in the latex to impart the necessary degree of stability. The greater the stress the latex will be subjected to, the higher the required stability is and the greater the required emulsifier content becomes.

In the processes used for making latices from those polymers (such as butyl) which cannot be emulsion polymerized but are instead emulsified as cements subsequent to polymerization, the latex encounters very severe mechanical and thermal stresses during the solvent stripping step and so it must possess a high degree of stability and have a high emulsifier content in order to survive this stripping step without coagulation. Hence, it is necessary that all (or at least a substantial part) of the emulsifier used in the emulsification step (as dictated by desired particle size) also be present during the stripping step. After solvent stripping has been completed (and the severe stresses encountered during this step have been survived) it is sometimes feasible to concentrate the latex and simultaneously reduce emulsifier concentration by centrifugation rather than to simply concentrate by continued (water) stripping. Although a reduction in emulsifier content even at this point in the process does cause some loss in stability, the reduction is nevertheless still often desirable in order to counteract some of the undesirable side effects of the emulsifier as already mentioned. Furthermore, some sacrifice in stability can often be tolerated after the solvent stripping has been completed because a higher degree of stability is required to withstand the severe stresses imposed by solvent stripping than the lesser stresses the latex is subjected to during storage, shipment and use. It must be re-emphasized through that even in the finished latex, a substantial part of the emulsifier must be retained or coagulation will occur.

With sulfonated butyl rubber, on the other hand, the situation is quite different. In order to help overcome the substantial energy barrier that must be surmounted to convert this ionomer from an internal associated state to a latex, it has been found to be necessary to use fairly large quantities of (preferably) nonionic emulsifiers, e.g., 10 to 20 weight percent based on polymer, to form a satisfactory raw emulsion. Such high emulsifier concentrations are very costly and produce very pronounced undesirable side effects in the finished latex and films or other items prepared therefrom. Furthermore, the preferred emulsifiers are nonionic types which contain a fairly long ethylene oxide chain. This type of emulsifier is known to be unstable under stripping conditions, particularly under the acidic conditions existing when the highly desirable acid-form of sulfobutyl is being stripped. Under acidic stripping conditions the ethylene oxide chain undergoes random cleavage to destroy the emulsifier and form hydrophylic emulsifier fragments. Since this cleavage problem is notoriously well known it was anticiptated that sulfobutyl latex would become destabilized and would coagulate during stripping as the emulsifier was destroyed. It was, therefore, surprising to find that the latex could be stripped without coagulation. Although the emulsifier was cleaved and destroyed under acidic stripconditions, the latex, surprisingly, remained stable. Nevertheless, the overall process is undesirable because of the high emulsifier cost and because the finished latex quality is poor because of the high concentration of water soluble emulsifier fragments remaining in the latex and contributing to the undesirable side effects already mentioned. Furthermore, some of the emulsifier fragments are so small that they (steam) distill overhead with the water and coat the stripping apparatus, condensers, etc., with a waxy film which must be periodically removed (which necessitates costly downtime for cleaning.

The latex quality problem can be alleviated by the conventional post-stripping approach of diluting and centrifuging the finished latex to remove excess emulsifiers and water solubles, but the recovered emulsifier is not reusable because it has been cleaved. Hence this centrifugation of finished latex instead of alleviating the high emulsifier cost actually contributes to higher latex cost by adding the cost of the centrifugation step. Centrifugation of the finished latex also leaves unsolved the problem of fouling of the stripping apparatus by the waxy emulsifier residues which are stripped off.

It has surprisingly been found though, and this constitutes one of the main features of this invention, that the raw sulfobutyl emulsions may be centrifuged prior to solvent stripping and in this manner all of the problems associated with high emulsifier content and emulsifier instability as outlined above can be alleviated. By centrifuging the raw emulsion, the emulsifiers are recovered in their original form (i.e., no cleavage has occurred prior to the stripping step) and the serum phase from the centrifuge can thus simply be recycled back to the emulsification step and reused. Hence the high emulsifier cost problem disappears. Since the same emulsifier may be used over and over again, it becomes economically feasible to use the required 10-20 weight percent emulsifier in the emulsification step. As an added bonus, the serum phase from centrifugation also contains most of the water-soluble cosolvent required for emulsification so that cosolvent recycle is also economically effected along with emulsifier recycle. Furthermore, since the emulsifier is removed from the latex proir to stripping, it doesn't cleave in the stripping apparatus to deposit the troublesome waxy deposits noted above. Hence the stripper fouling problem is also eliminated by centrifugation of the raw (or unstripped) latex. And the latices so formed are substantially free of emulsifier, impurities or their decomposition products so that a high quality latex can be made. Centrifugation of the raw latex thus solves all the above problems simultaneously and makes production of sulfobutyl latex practical. It should also be pointed out that centrifugation of the raw latex is much easier to accomplish than is centrifugation of the finished latex.

Despite the ease of raw latex centrifugation as compared to finished latex centrifugation, the former is seldom if ever practical because with most latices a high emulsifier content is required during stripping to prevent coagulation of the latex cement by the severe mechanical and thermal stresses accompanying the solvent stripping step. With sulfobutyl latex, raw latex centrifugation has been found to be both desirable and practical. Not wishing to be bound by theory it is believed this is because the sulfonate groups on the polymer act as a built-in emulsifier and make the polymer self-emulsifying once the proper configuration is achieved. Hence, sulfobutyl latex does not require added emulsifier to stabilize it and all the added emulsifier can be safely removed prior to stripping. The added nonionic emulsifiers are required only during the emulsification step to help overcome the energy barrier in going from the internally associated dry ionomer to the latex (i.e., to produce the required latex configuration with sulfonate groups sticking out into the water phase). Raw emulsion centrifugation makes it possible to use these required emulsifiers in the emulsification step and then recycle them directly and economically so that they don't inordinately increase latex cost or contribute to the other problems discussed above.

In the preparation of films of sulfonated butyl rubber it was found that cracking occasionally occurred in the cast films. Surprisingly, it has been found that the addition of minor amounts of plasticizer eliminated this cracking. Suitable plasticizers are petroleum oils and preferably the conventional rubber process oils. These process oils are described in ASTM D2226-70 as extender oils. Illustrative examples of these oils suitable for use as plasticizers are the naphthenic ASTM Type 103 and 104A oils and the paraffinic ASTM Type 104B oils. Examples of the naphthenic Type 103 and 104A type oil are Flexon 845, and Flexon 640. Examples of the paraffinic oils are Flexon 840 and Flexon 845. It is obvious to those skilled in the art that white oils derived from similar base stocks may be used as plasticizers for light colored latices.

Generally any petroleum oil having a viscosity of at least 20 cs. at 100° F. may be used. More preferably, the oil has a viscosity of about 40 cs. at 100° F. Preferably, the process oil is introduced as an oil-in-water emulsion. Methods for emulsifying these oils are well known in the art. About 5 to about 10 parts per hundred based on the total latex of oil is added to the latex. Alternatively, about 8 to about 15 parts per hundred based on latex of an organic solvent which has a higher boiling point than water, is a solvent for the polymer, and does not azeotrope too readily with water, may be added to the latex. The films prepared in this manner do not exhibit any cracking and have exceptionally high tensile strength.

Generally these organic solvents are compounds which are liquid at room temperature, more preferably $C_7$-$C_{15}$ hydrocarbon compounds, e.g., $C_7$-$C_{10}$ hydrocarbon compounds. Illustrative examples of these $C_7$-$C_{30}$ normally liquid hydrocarbon compounds are ethyl benzene, xylene, octane, nonane, decane, cumeme, cyclooctane, mesitylene, cymene. Chlorinated hydrocarbons such as o-dichlorobenzene, chloroethyl benzene, etc., are also suitable.

The term "plasticizer" as used in the specification and claims means the aforedescribed petroleum oils and the normally liquid at room temperature oranic solvents which have a higher boiling point than water and do not azeotrope with water.

The advantage of this invention may be more clearly appreciated by reference to the following examples.

EXAMPLE 1

A cement of sulfonated butyl rubber was prepared from a butyl rubber containing about 1.5 mole percent sulfonic acid. The sulfonating agent was acetyl sulfate. The butyl rubber backbone had a Mooney viscosity of about 60 (ML 260° F.) and a viscosity average molecular weight of about 450,000. The hexane cement contained 16.9 weight percent solids. Attempts were made to prepare emulsions from this cement using the acid form of the sulfonated butyl rubber. The following compositions were prepared:

Oil phase: Grams
    Cement (acid form) _____ 300
    Isopropyl alcohol _____ 30
    Neutronyx 622 _____ 3
Water phase:
    Distilled water _____ 186
    Pluronic L-64 _____ 2.5

The Pluronic L-64 emulsifier was dissolved in the water and the Neutronyx 622 emulsifier and isopropyl alcohol cosolvent were mixed with the cement. The oil phase thus prepared was then added to the water phase in a Gifford-Wood Homomixer (Dispersator) set at an open gap and at a speed setting of 70 volts. A good emulsion was formed immediately and all of the oil phase was dispersed without difficulty. The mixture was then set at 110 volts and the gap closed to increase shearing. No problems were encountered and the final emulsion was a very fluid oil-in-water emulsion with excellent appearance and stability. No separation was observed after about two days of standing.

EXAMPLE 2

In the preparation of latices from emulsions of rubbers, it is preferred that the emulsifier level in the finished latex be less than 5 parts per hundred in order to minimize the nonpolymer contaminants in the finished latex. The amount of emulsifier in the finished latex may be reduced by centrifuging the emulsion from which latex is derived.

A sulfonated butyl rubber cement was prepared from a sulfonated butyl rubber having a 1.5 mole percent sulfonic acid content, the emulsion butyl rubber from which the sulfonic acid part was derived had a Mooney viscosity of about 60 (ML 260° F.) and a viscosity average molecular weight of about 450,000. The hexane cement comprised 15 weight percent solids and 17 weight percent isopropyl alcohol. A water phase was prepared comprising 6400 grams of distilled water, 72 grams of Neutronyl 675 and 72 grams of Triton X-100. 5608 grams of the aforementioned cement were stirred into the water phase. The mixture was then run through a Gifford-Wood Homomixer on the following schedule:

8 mins. @ 30 volts and open gap
    8 mins. @ 50 volts and open gap
    8 mins. @ 70 volts and open gap
    8 mins. @ 110 volts and open gap
    8 mins. @ 70 volts and closed gap
    8 mins. @ 110 volts and closed gap All the material from the dispersator was passed into a colloid mill three times with a closed gap setting. The emulsions showed good stability and had excellent appearance.

The emulsion was run twice into a Centrico, Inc. (Westfalia Separator) centrifuge (Model LWA-205) and a speed setting of 12,000 r.p.m. The effect of centrifugation on the product is shown in Table II.

TABLE II

| | Emulsifier conc., phr. of polymer | Water conc. as weight percent of polymer |
|---|---|---|
| Orig. feed (Prod. from I) | 16.9 | 750 |
| After first pass | 6.8 | 300 |
| After second pass (For this pass the cream was diluted back to original water level of 750% on polymer) | 3.0 | 320 |

The final centrifuged emulsion had a concentration of only about 18% of the original emulsifier level and a water concentration of only about 43% of the original emulsion. This concentrated product was distilled in the vacuum to remove the n-hexane, isopropyl alcohol and much of the water. The final latex comprised 44 weight percent polymer, the balance being substantially water. The latex had an average particle size of about 0.5 microns, had a good appearance and good stability. Films cast from the latex exhibited excellent tensile strength, i.e., about 3,000 p.s.i.

In carrying out the process commercially, the serum which comprises predominantly emulsifier and isopropyl alcohol may be reused by dispersing it in additional water with the addition of additional emulsifier to make up that emulsifier which was carried off in the latex.

EXAMPLE 3.—ADVANTAGE OF "RAW" LATEX CENTRIFUGATION

A butyl rubber cement comprising 16.9 weight percent solids in hexane was sulfonated using an $SO_3$ triethyl phosphate complex as the sulfonating agent by methods well known in the art (Ser. No. 877,849; 123,903). The original unsulfonated polymer in the cement was Enjay Butyl® 218 with a mole percent unsaturation of 1.9%, a Mooney viscosity of about 60 (ML 260° F., 1+3 min., 2.0 r.p.m.) and a viscosity average molecular weight $\overline{M}_v$ of about 450,000. The sulfobutyl polymer produced contained 1.5 mole percent sulfonate by analysis. The polymer was retained in the acid-form (unneutralized) but 16.5% by weight on the cement of n-propyl alcohol was added as a quench for the sulfonation reaction and also to serve as the cement portion of the polar cosolvent required to permit emulsification. This "acid-form" alcohol-containing cement comprised the oil phase to emulsification after the alcohol addition; its composition was as follows:

"OIL PHASE"

| | |
|---|---|
| Sulfonated butyl rubber (1.5 mole percent $SO_3H$) | 14.5 |
| n-Propyl alcohol | 14.1 |
| Hexane | 71.4 |
| | 100.0 |

A "water phase" for emulsification was prepared by dissolving emulsifiers and n-propyl alcohol in water to give the following composition:

"WATER PHASE"

| | |
|---|---|
| Deionized water | 90.51 |
| Neutronyx 675 | 1.925 |
| Igepal CO–530 | 0.385 |
| n-Propyl alcohol | 7.18 |
| | 100.00 |

A raw latex was prepared by mixing 342.82 lbs. of the "water phase" in a agitated 100 gal. mix tank; adding 275 lbs. of the "oil phase," and recycling the entire batch three times through a shear pump at 2300 r.p.m. The resulting crude raw latex was refined by sonolation. It was given 3 passes through the sonolator at 250 p.s.i.g. and then 2 passes at 500 p.s.i.g. The resulting refined raw latex was fluid and stable with a particle size well below 0.5 microns.

At this point in the process the 617.82 lbs. of refined "raw" latex contained 39.9 lbs. of polymer, 6.6 lbs. of Neutronyx 675, 1.32 lbs. of Igepal CO–530; and 63.4 lbs. of propyl alcohol. The balance of the raw latex was 310.3 lbs. of water and 196.3 lbs. of hexane. According to the process for application Ser. No. 219,496, this would be passed onto stripping and stripped to about 50% solids. The 196.3 lbs. of hexane would be stripped out along with the 63.4 lbs. of propyl alcohol and about 270 lbs. of water. The Neutronyx 675 and Igepal CO–530 would be partly cleaved during the stripping and some portion would "steam" distill off with the water. The balance of cleaved emulsifier would remain with the concentrated latex. The stripper and condenser would be fouled by the cleaved emulsifiers and require cleaning before reuse. The removed condensate consisting of a mixture of alcohol, water, hexane, and cleaved emulsifier residues would be very difficult to separate and present a recovery or disposal problem. The concentrated latex would have to be rediluted and recentrifuged at least twice to remove emulsifier residues and these steps would generate more waste serum. Overall, to produce the 39.3 lbs. of sulfonated butyl in latex form, 6.6 lbs. of Neutronyx 675, 1.32 lbs. of Igepal CO–530, and 63.4 lbs. of propyl alcohol would have been consumed. The 196.3 lbs. of hexane would be contained in a difficult to recover or dispose of condensate and waste serum phase from centrifugation would have to be disposed of. Ignoring the hexane recovery and disposal problems, chemical costs to produce this latex would exceed 26.5¢ per lb. of dry polymer contained.

According to the improved process of this invention the 617.82 lbs. of refined raw latex was actually centrifuged instead of being passed onto stripping. In the first pass through the centrifuge conditions were adjusted so that a 36/64 serum/cream split was achieved. The 222 lbs. of serum removed consisted of:

| | Lbs. |
|---|---|
| Water | 180.5 |
| Propyl alcohol | 36.9 |
| Neutronyx 675 | 3.84 |
| Igepal CO–530 | 0.77 |
| Total | 222.0 |

The 395.82 lbs. of cream recovered consisted of:

| | Lbs. |
|---|---|
| Sulfonated butyl rubber | 39.9 |
| Hexane | 196.3 |
| n-Propyl alcohol | 26.5 |
| Water | 129.8 |
| Neutronyx 675 | 2.76 |
| Igepal CO–530 | 0.56 |
| Total | 395.82 |

In this one pass through the centrifuge nearly 60% of the emulsifiers and alcohol were removed with the serum and made available for recycle.

The 395.82 lbs. of cream was next rediluted with 222 lbs. of deionized water, mixed, and again passed through the centrifuge. In this second pass conditions were again adjusted to give the desired 36/64 serum cream split. The 222 lbs. of 2nd pass serum removed consisted of:

| | Lbs. |
|---|---|
| Water | 205.4 |
| Propyl alcohol | 14.7 |
| Neutronyx 675 | 1.54 |
| Igepal CO–530 | 0.31 |

The 395.82 lbs. of 2nd pass cream recovered consisted of:

| | Lbs. |
|---|---|
| Sulfonated butyl rubber | 39.9 |
| Hexane | 196.3 |
| n-Propyl alcohol | 11.8 |
| Water | 146.35 |
| Neutronyx 675 | 1.22 |
| Igepal CO–530 | 0.25 |
| Total | 395.82 |

This second pass cream was then passed on to stripping and stripped to about 50% solids. The 196.3 lbs. of hexane, 11.8 lbs. of propyl alcohol and 106.4 lbs. of water were vaporized out overhead and condensed. The emulsifier content of the cream feed to the stripper was low enough now that no appreciable amount of cleavage product came off overhead. No emulsifiers were present and alcohol content of the condensate was now low enough (less than 6% on hexane versus greater than 32% on hexane when the "raw" latex was fed directly to stripping) that the hexane separated cleanly from the water/alcohol layer and could be easily recovered for reuse. No stripper fouling by waxy deposit was noted so that cleaning was unnecessary.

The serum phases from the two centrifugations of the raw latex were combined, concentrated and made up with fresh emulsifier for reuse in preparing the next branch of latex. Therefore a total of 5.33 lbs. of the Neutronyx and 1.08 lbs. of the Igepal (>80% of the emulsifier and most of the alcohol were recovered for reuse and recycled directly. The concentrated latex produced contained only 1.47 lbs. of emulsifier per 39.9 lbs. of polymer or only about 3.5 phr. and was suitable for use directly. Overall, to produce the 39.9 lbs. of sulfonated butyl in latex form 1.22 lbs. of Neutronyx 675, 0.25 lbs. of Igepal CO–530, and 11.8 lbs. of propyl alcohol were consumed. The balance of these chemicals were recycled in the serum phases from the "raw" latex centrifugation. The 196.3 lbs. of hexane was easily separated from the condensate for re-use and no waste serum stream was generated for disposal. Chemical costs to produce the latex by this improved process were reduced to less than 5.0¢ per lb. of dry polymer contained (versus >26.5¢/lb. without "raw" latex centrifugation). "Raw" latex centrifugation also eliminated the hexane recovery, stripper fouling, and the waste disposal problems inherent in the original process proposed in U.S. application No. 219,496. Furthermore, the water stripping load was reduced from 270 lbs. to 106 lbs. per 39.9 lbs. of polymer or from nearly 7 lbs. per lb. of polymer to about 2.6 lbs. per lb. of polymer. This represents an additional economic saving for the use of "raw" latex centrifugation.

The concentrated latex produced was of high quality. Particle size was well below 0.5 microns and dried films cast from this latex gave tensile strengths in excess of 4000 p.s.i.g. (without any curing or additives being necessary).

EXAMPLE 4

The sulfonated butyl rubber of Example 1 was dissolved in tetrahydrofuran to form a cement comprising 18 weight percent polymer in tetrahydrofuran. An emulsion was prepared as follows:

| Oil phase: | Grams |
|---|---|
| THF cement | 1200 |
| Igepal CO–530 | 4.5 |
| Water phase: | |
| Distilled water | 741 |
| Neutronyx 675 | 9 |

The water and oil phases were mixed separately and poured together into a separatory funnel and shaken thoroughly. The initial mixture was a loose gel, but after standing overnight and with further shaking, it became smooth and homogeneous and reasonably fluid. It was then run in the Gifford-Wood Homomixer (dispersator) at 70 volts and setting of ½ inch open gap. After 5 minutes it was very fluid. The gap was closed and the speed set at 110 volts and the mixer run for another two minutes. The product was an oil-in-water emulsion of excellent appearance. The product was neutralized to a pH of 9.0 with a 35 weight percent water solution of ethyl amine. The neutralized emulsion remained stable.

EXAMPLE 5

The emulsion of Example 4 was filtered through cheese cloth and distilled in the vacuum to remove tetrahydrofuran and some of the water. The finished latex from the still was filtered through cheese cloth. The latex therefrom had a pH of 5, contained 36 weight percent solids, and appeared smooth and fluid with no creaming. A film was cast from the latex which had an average particle size of 0.5 microns. The gum film had a tensile strength of 3,000 p.s.i. It is significant that the stable latices were prepared at low emulsifier levels, ca. 6 parts per hundred whereas ordinarily emulsifier levels of about 15 parts per hundred are typical. Additionally, where the tetrahydrofuran was used as the solvent, less water was necessary to prepare oil-in-water emulsions, e.g., 61 weight percent water as compared to 140 weight percent, than when an organic water immiscible solvent is used to prepare the cement.

EXAMPLE 6

Cracking of sulfonated butyl rubber films formed from latices has been observed. In order to prevent cracking plasticizers may be added.

(a) An emulsion of Flexon 840 a paraffinic ASTM 4 type rubber process oil was emulsified using the following formulation.

| Oil phase: | Grams |
|---|---|
| Flexon 840 | 400 |
| Stearic acid | 20 |
| Water phase: | |
| Distilled water | 552 |
| Volclay SPU [1] | 8 |
| Triethanol amine | 20 |

[1] Fine particle size Bentonite clay.

The two phases were mixed using an electric stirrer. An emulsion formed readily.

(b) The above oil emulsion was added to a portion of the latex of Example 2 such that the addition was equivalent to 5 phr. oil based on the latex. Films were cast from the plasticized and unplasticized latices. The films containing no plasticizer exhibited cracking during drying whereas films prepared from the oil containing latex did not crack at all.

(c) The above experiment was repeated except that about 10 phr. of xylene was added to the latex as the plasticizer. Again the films formed from the latex dried without cracking.

The aforementioned experiments were repeated using pigmented sulfonated butyl rubber latices. No cracking of the films prepared from the latices was observed.

Although the above examples have been carried out using hydrocarbon solvents to form the rubber cements, certain advantages can be realized by using as solvent a water-miscible organic solvent which is a solvent for the rubber. Where such a solvent is used, the need for a cosolvent is avoided and the amount of emulsifier necessary to form stable emulsions is greatly reduced, e.g., about one-half that otherwise required.

Illustrative examples of such water-miscible solvents are tetrahydrofuran, dioxane, hydrocarbon substituted dioxanes, or mixture thereof, etc.

What is claimed is:

1. In a process for preparing a sulfonated butyl rubber latex comprising the steps of (1) preparing an emulsion of a butyl rubber cement in water; (2) refining the emulsion to a refined latex stage by mechanical working; and (3) stripping the excess water to form a finished latex, the improvement which comprises:
    (a) centrifuging the emulsion prior to stripping; and
    (b) separating out a light concentrated emulsion phase and a heavy serum phase.

2. The process of claim 1 wherein the serum is recycled to prepare new emulsions.

3. The process of claim 1 wherein the emulsion is centrifuged prior to the refining step.

4. The process of claim 1 wherein the emulsion is centrifuged subsequent to the refining step.

5. In a process for preparing a sulfonated butyl rubber latex comprising the steps of (1) preparing an emulsion of a butyl rubber cement in water; (2) refining the emulsion to a refined latex stage by mechanical working; and (3) stripping the excess water to form a finished latex, the improvement which comprises a method for reducing fouling in the stripper by:
    (a) centrifuging the emulsion prior to stripping; and
    (b) separating out a light concentrated emulsion phase and a heavy serum phase
thereby removing excess emulsifiers and eliminating fouling caused by said emulsifiers.

6. The process of claim 5 wherein the serum is recycled to prepare new emulsions.

7. The process of claim 5 wherein the emulsion is centrifuged prior to the refining step.

8. The process of claim 5 wherein the emulsion is centrifuged subsequent to the refining step.

9. In a process for preparing a sulfonated butyl rubber latex by emulsifying a sulfonated butyl rubber cement the improvement which comprises using as the solvent of the cement a solvent for the rubber which is water miscible.

10. The process of claim 9 wherein the solvent is tetrahydrofuran.

References Cited

UNITED STATES PATENTS

| 3,445,414 | 5/1969 | Glymph et al. | 260—29.6 PT |
| 3,642,728 | 2/1972 | Canter | 260—79.3 |
| 3,673,142 | 6/1972 | Saunders et al. | 260—29.6 PT |

ALLAN LIEBERMAN, Primary Examiner

T. DeBENEDICTIS, Sr, Assistant Examiner

U.S. Cl. X.R.

260—29.7 H, 29.7 PT, 79.3 R